P. C. HEWITT.
ELECTRICAL PRODUCTION OF LIGHT.
APPLICATION FILED MAR. 21, 1911.
1,079,344.
Patented Nov. 25, 1913.
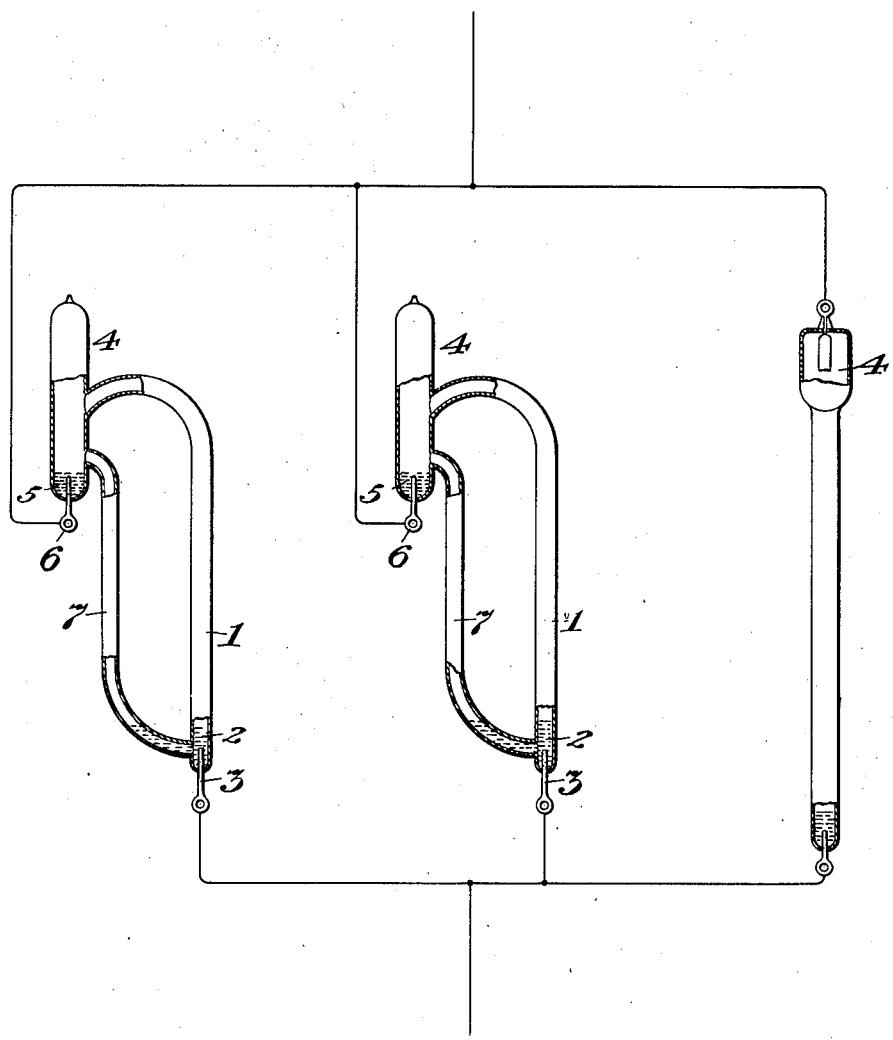
WITNESSES:
INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL PRODUCTION OF LIGHT.

1,079,344.  Specification of Letters Patent.  Patented Nov. 25, 1913.

Original application filed April 29, 1899, Serial No. 714,995. Divided and application filed March 27, 1900, Serial No. 10,360. Divided and this application filed March 21, 1911. Serial No. 615,914.

*To all whom it may concern:*

Be it known that I, PETER COOPER HEWITT, a citizen of the United States, and resident of Ringwood Manor, county of Passaic, State of New Jersey, have invented certain new and useful Improvements in Electrical Production of Light, of which the following is a specification.

This invention relates to a method for producing electric light and the subdivision of the electric current by gaseous medium, utilizing an electric current of comparatively low pressure to produce light by means of an inclosed gas.

In carrying out my invention I employ within a suitably formed vapor tube, or container, a medium, which, while in a gaseous or vapor condition is capable of passing an electric current of low pressure and considerable quantity. For such conducting medium I have found that mercury vapor becomes intensely light radiant when passing an electric current, and further, I have discovered that other agents when in a gaseous state become light radiant when forming part of an electric circuit, the inclosed vapors passing a definite amount of current.

In carrying out my invention I employ a vapor tube,—such a tube, for example, as is shown in parallel arrangement in the accompanying drawing.

Referring to the drawing, 1 designates a glass tube for containing the light-giving agent, which in its natural state rests in the lower portion of the tube, as at 2, and in electrical contact with an electrode lead 3. The upper portion of the tube 1 communicates with a chamber 4, and in the form shown in the drawing, there is in the lower end of the chamber 4, a conducting agent 5 in contact with an electrode lead 6. From a point slightly above the level of the material 5, in the chamber 4, a tube 7 leads to and communicates with the tube 1 at a point, as here shown, slightly below the normal level of the material 2. This tube 7 serves to return to the tube 1 any condensation of material that may occur, and it also automatically returns to the lower portion of the tube any conducting agent that may be carried from electrode 3 to the other. The temperature of the electrode is controllable, the vapor, as produced, absorbing the heat, as described and claimed in my application for patent Serial No. 677,199, filed April 11th, 1898.

In the operation of my invention the conducting medium is to be vaporized or volatilized by any suitable means, such as by applying heat externally or internally. The vapor forms an electrical connection between the two electrodes, and upon the passage of an electric current, either alternating or continuous, the vapor in the tube 1 and the lower part of the chamber 4, becomes light radiant to a high degree, and this result may be obtained from currents of different voltage, from 50 volts, or lower, and upward, as desired. The tube operates on any of the ordinary commercial electric currents. While the vapor is in its luminous state in the tube 1, a certain amount of vapor passes into the chamber 4, but does not become luminous in the upper portion thereof, nor in the tube 7, because no current passes through it. This vapor in the chamber 4, when condensed by said chamber 4, will flow down to the material 5 and overflows through the tube 7 to its initial position in the tube 1. The vapor contained in the chamber 4 will act as an equalizer to give the light a uniform brilliancy and steadiness, and still further, the chamber 4 will act as a receiver for and retain impurities that may be contained in the conducting medium, said impurities being driven into said chamber 4 by the vapor from the volatilizable medium. In the drawing I have shown, though I do not claim herein, a second form of tube, the same being vertical and having a chamber, 4, which does not carry current and serves the same general purpose as the chamber 4 already described.

In this invention the quantity of current used by the tube is governed by the vapor contained by the tube, and not by a filament or other solid conductor.

In practice, several tubes may be connected either in parallel, as shown in the drawing, or in series; and while I have shown but two forms of tube, I have used tubes of various other forms which need not be disclosed herein; and obviously a great variety of forms may be used. The tube is a current regulator, allowing a given amount of current to pass at a given vapor pressure, thereby enabling the subdivision of the current by an inclosed gaseous medium.

In order to produce one of my tubes, I first exhaust it to a high vacuum, hot, then turn on the electric current, and, while the current is on, cause the vapor to flow through the tube, or generate in the tube and flow into the pump until it has carried away with it all the impurities existing in the tube. These vapor impurities develop in a tube apparently perfectly exhausted, on the passage of the electrical current, and their absolute removal and prevention from reappearance is most easily effected in this manner. The quantity of light is in this way proportional to the vapor density; a density of low resistance makes it possible to employ a current of low voltage in producing light. The quantity of light is under absolute control by varying the quantity of the current, the density of the vapor, or the nature of the vapor. As the vapor in the tube may be very attenuated in some cases, it may become necessary in the economical use of some vapors to use a starting device to acquire the proper vapor density on starting. Such a starting device may consist of applied or external heat, or increased electrical potential for the time being. In the practical construction of my lamp, when the lamp is to be operated upon a circuit of given potential, if it is found that it permits the passage of more amperes than desired, then the amperes may be reduced by elongating the vapor path of the current between the electrodes, and vice versa. Increasing or decreasing the area of the inclosure not carrying current and referred to as the condensing or impurity containing chamber, will increase or diminish the amperes which the lamp will take. But in case the lamp should fail to run, then the size of the condensing chamber may be increased and the vapor column modified to suit the circumstance.

The number of different forms and shapes of tubes which are possible and which it may be desired to use is so great, as is also the number of different vapors which may be employed, as to render it impracticable to give definite instructions for each case, but the general rules above stated will enable one skilled in the art to produce lamps successfully.

This application is a division of my application Serial Number 10,360, filed March 27th, 1900, which latter application is, in turn, a division of my application Serial Number 714,995, filed April 29th, 1899.

I claim as my invention:

1. In a mercury vapor apparatus, the combination with an exhausted container having two separated electrode chambers and a connecting portion constituting a vapor path, and mercury in said chambers constituting the electrodes, of means for condensing mercury vapor generated in the operation of the said apparatus and for collecting said mercury in the upper of said electrodes, together with means for returning the excess of the accumulated mercury to the lower electrode through a return tube separate from the said vapor path.

2. An electric lamp of the character described, comprising an exhausted vapor-containing inclosure, a mercury electrode in one portion of said inclosure, a second mercury electrode at another portion of the inclosure, a current vapor path between the electrodes and a return tube for carrying mercury overflowing from the first named electrode to the second named electrode.

3. A vaporizable conducting liquid apparatus comprising an exhausted container having a tubular light giving portion and a condensing chamber, vaporizable conducting liquid electrodes therein at the terminals of said light giving portion, and means for maintaining the normal distribution of the vaporizable conducting liquid between the electrodes, said means being independent of said light giving portion.

4. In a vapor electric apparatus comprising an exhausted container and two mercury electrodes therein connected by a current path, one electrode being located above the other, means for condensing vaporized material in said container and for discharging it into the upper electrode and means for maintaining the normal level of said electrodes, said last named means consisting of a return tube, separate from said current path, for taking the overflow of said upper electrode to the lower electrode.

5. In a vapor electric apparatus, the combination with an exhausted container and two mercury electrodes therein connected by a vapor path, of means for maintaining the normal distribution of the mercury between these electrodes, said means operating independently of said vapor path.

6. A mercury vapor apparatus comprising an exhausted container having a tubular light giving portion and a condensing chamber, mercury electrodes in said container at the terminals of said light giving portion and means for maintaining the normal distribution of mercury between the electrodes and for preventing the overflow of unvaporized mercury into the light-giving portion.

7. In a mercury vapor lamp, an exhausted container having a light giving portion and mercury electrodes therein, in combination with means for maintaining a normal distribution of mercury between said electrodes and for preventing the overflow of unvaporized mercury into the light giving portion.

8. A mercury vapor apparatus comprising an exhausted container and vaporizable electrodes therein separated by a normal vapor path, in combination with means for maintaining a normal quantity of electrode material in the several electrodes and for preventing the overflow of unvaporized mercury into the vapor path.

9. In a vapor electric apparatus comprising an exhausted container and a plurality of vaporizable electrodes therein separated by a current vapor path, the method of operation which consists in vaporizing a portion of each of the electrodes during operation and maintaining the normal quantity of electrode material in each electrode and for preventing the overflow of unvaporized mercury into the vapor path between the electrodes.

10. A vapor apparatus comprising an exhausted container, a plurality of vaporizable reconstructing electrodes therein, a normal vapor path separating said electrodes, and means for maintaining the normal distribution of condensed electrode material independently of the passage way through the vapor path.

11. A vapor apparatus comprising an exhausted container, a portion of said container constituting a vapor path, electrodes in said container at opposite ends of said vapor path, said electrodes being of vaporizable reconstructing material, a source of current and connections for operating said apparatus, in combination with means for maintaining the distribution of the condensed electrode material between the electrodes independently of the path between the electrodes traversed by current from said source.

12. A vapor electric apparatus comprising an exhausted container and a plurality of mercury electrodes therein and means for maintaining a normal distribution of the mercury in said electrodes during operation, said means including locally operating heat radiating means.

13. A mercury vapor apparatus comprising an exhausted container, a plurality of mercury electrodes at different levels therein and means for maintaining the level of the upper of said electrodes, said means including heat dissipating means, locally operating for the benefit of said last named electrode.

14. In a vapor electric apparatus, the combination of an exhausted container, a plurality of mercury electrodes therein and means for utilizing local heat radiating means for assisting in maintaining the normal level of the mercury electrodes during operation.

15. In a vapor electric apparatus, the combination with an exhausted container and mercury electrodes therein at different levels, of locally operating heat radiating means for assisting in maintaining the level of the upper electrode.

Signed at New York in the county of New York and State of New York this 15th day of March A. D. 1911.

PETER COOPER HEWITT.

Witnesses:
   WM. H. CAPEL,
   THOS. H. BROWN.